(12) United States Patent  
Sheen

(10) Patent No.: US 8,350,537 B2  
(45) Date of Patent: Jan. 8, 2013

(54) POWER SUPPLY TRANSIENT RESPONSE IMPROVING

(75) Inventor: Timothy Sheen, Brighton, MA (US)

(73) Assignee: Bose Corporation, Framingham, MA (US)

( * ) Notice: Subject to any disclaimer, the term of this patent is extended or adjusted under 35 U.S.C. 154(b) by 491 days.

(21) Appl. No.: 12/717,216

(22) Filed: Mar. 4, 2010

(65) Prior Publication Data

US 2011/0215776 A1 Sep. 8, 2011

(51) Int. Cl.  
 *G05F 1/575* (2006.01)
(52) U.S. Cl. .................. 323/207; 323/285; 307/103
(58) Field of Classification Search .................. 323/207, 323/285–286; 363/39, 44–46, 48; 307/103  
See application file for complete search history.

(56) References Cited

U.S. PATENT DOCUMENTS

| | | | |
|---|---|---|---|
| 4,253,079 A | 2/1981 | Brosh | |
| 5,319,342 A | 6/1994 | Kuroki | |
| 5,838,145 A * | 11/1998 | Poon et al. | 323/266 |
| 5,982,264 A | 11/1999 | Nakao et al. | |
| 6,288,605 B1 | 9/2001 | Botti et al. | |
| 6,369,685 B1 | 4/2002 | Milavec et al. | |
| 6,628,531 B2 | 9/2003 | Dadafshar | |
| 6,771,123 B2 | 8/2004 | Pearce | |
| 6,882,219 B2 | 4/2005 | Leedham | |
| 6,914,508 B2 | 7/2005 | Ferencz et al. | |
| 7,132,891 B1 | 11/2006 | Dening et al. | |
| 7,161,428 B2 | 1/2007 | Mendenhall | |
| 7,321,262 B2 | 1/2008 | Nielsen et al. | |
| 7,332,993 B1 | 2/2008 | Nussbaum | |
| 7,400,126 B2 * | 7/2008 | Iwashita | 323/286 |
| 7,432,793 B2 | 10/2008 | Nussbaum | |
| 7,498,781 B2 * | 3/2009 | Canfield et al. | 323/280 |
| 7,501,889 B2 | 3/2009 | Mendenhall | |
| 7,683,707 B2 | 3/2010 | Ljusev et al. | |
| 7,839,215 B2 | 11/2010 | Mendenhall | |
| 7,889,041 B2 | 2/2011 | Minteer | |
| 7,920,082 B2 | 4/2011 | Kawai et al. | |
| 2002/0070835 A1 | 6/2002 | Dadafshar | |
| 2002/0125941 A1 | 9/2002 | Nguyen | |
| 2002/0175747 A1 | 11/2002 | Tang et al. | |
| 2004/0028242 A1 | 2/2004 | Kitamura | |
| 2004/0174241 A1 | 9/2004 | He et al. | |
| 2005/0253565 A1 | 11/2005 | Cohen | |
| 2006/0097779 A1 | 5/2006 | Balakrishnan et al. | |
| 2007/0139151 A1 | 6/2007 | Nussbaum | |

(Continued)

FOREIGN PATENT DOCUMENTS

DE 102007019110 A1 10/2008

(Continued)

OTHER PUBLICATIONS

International Search Report and Written Opinion dated Apr. 26, 2011 for Int. Appln. No. PCT/US2011/024434.

(Continued)

*Primary Examiner* — Harry Behm

(57) ABSTRACT

A power factor correcting power supply. The power factor correcting power supply includes a controlled current source for providing electrical power of a regulated current and a regulated voltage to a first output terminal, a voltage comparison current controller, and a control circuit responsive to the current at the output terminal, the control circuit coacting with the voltage comparison current controller to cause the controlled current source to increase or decrease the current at the first output terminal.

10 Claims, 3 Drawing Sheets

U.S. PATENT DOCUMENTS

| | | |
|---|---|---|
| 2007/0159289 A1 | 7/2007 | Lee et al. |
| 2008/0192960 A1 | 8/2008 | Nussbaum et al. |
| 2009/0004126 A1 | 1/2009 | Lowndes |
| 2009/0027025 A1 | 1/2009 | Latham et al. |
| 2009/0041266 A1 | 2/2009 | Guo et al. |
| 2009/0309658 A1 | 12/2009 | Mendenhall |
| 2010/0219926 A1 | 9/2010 | Willers et al. |

FOREIGN PATENT DOCUMENTS

| | | |
|---|---|---|
| EP | 1764901 A2 | 3/2007 |
| GB | 2250383 A | 6/1992 |
| GB | 2351620 A | 1/2001 |

OTHER PUBLICATIONS

Putzeys, B.: "A True One-Bit Power Ad Converter", AES, New York, NY. May 13, 2002.

Watanabe S. et al: "Digitally-controlled optimum current tracking scheme of two-paralleled high-power PWM amplifier for magnet resonance imaging", Power Electronics Specialists Conference, 28th Annual Ieee, New York, NY, Jun. 22, 1997.

International Search Report and Written Opinion dated May 18, 2011 for Int. Appln. No. PCT/US2011/024675.

International Search Report and Written Opinion dated Aug. 3, 2011 for PCT/US2011/026015.

International Preliminary Report on Patentability dated Sep. 13, 2012 for PCT/US2011/024434, 6 pages received.

F. N. Poon et al: "Very fast transient voltage regulators based on load correction", 30th Annual IEEE Power Electronics Specialists Conference, vol. 1, pp. 66-71, Jun. 27, 1999.

International Preliminary Report on Patentability dated Sep. 13, 2012 for PCT/US2011/026015, 8 pages received.

International Preliminary Report on Patentability dated Sep. 13, 2012 for PCT/US2011/024675, 5 pages received.

* cited by examiner

R1 = 3.32K
R2 = 1K
R3 = 866K
R4 = 866K
R5 = 1K
C1 = 10n
C2 = 6800p
C3 = 2200p

POWER SUPPLY TRANSIENT RESPONSE IMPROVING

BACKGROUND

Regulated power supplies typically incorporate a means to sense the deviation of the output voltage from the desired value, the output of which controls a means of adjusting the output voltage to restore it to the desired value. This feedback control loop typically does operate instantaneously, especially in the face of sudden changes in the current demanded by the load being supported. To alleviate this, a capacitor, which can provide current to the load during the brief period before the feedback loop can respond, is usually placed at the supply output.

This combination, typically does not maintain the supply output completely stable in the face of load current changes. In particular, the presence of the capacitor, while improving performance by briefly providing current to the load during transients, also tends to degrade performance by slowing down the response of the control loop. This problem can be partly mitigated with sophisticated design of the output voltage control loop. In particular, using the output voltage error to control the current delivered into the output capacitor (an inner current control loop, creating a voltage-controlled current source) allows a very fast voltage control loop while still maintaining stability.

SUMMARY

In one aspect a power factor correcting power supply includes a controlled current source for providing electrical power of a regulated current and a regulated voltage to a first output terminal; a voltage comparison current controller; and a control circuit responsive to the current at the output terminal, the control circuit coacting with the voltage comparison current controller to cause the controlled current source to increase or decrease the current at the first output terminal. The control circuit may include a current sensor measuring current at the first output terminal. The control circuit may further include a second output terminal. The first output terminal and the second output terminal may be for accommodating terminals of an electrical load. The control circuit may further include a bypass capacitor coupling the first output terminal and the second output terminal. The current sensor may measure the combined current flowing through the output capacitor and to the output terminal. A voltage sensor may sense voltage at the output terminal. A derived current calculator may be operationally coupled to the current sensor and to the voltage sensor to determine the current at the output terminal exclusive of current flowing in the bypass capacitor. The derived current calculator may determine the current at the output terminal exclusive of current flowing in the bypass capacitor according to $$I_L = I_S - C\frac{dV}{dT},$$

where $I_L$ is the current at the current at the output terminal exclusive of the current flowing in the bypass capacitor; $I_S$ is the current measured by the current sensor; C is the capacitance of the load capacitor, and $$\frac{dV}{dT}$$

is the rate of change of the voltage sensed by the voltage sensor with respect to time. The power factor correcting power supply may further include a power factor correcting waveform shaper coupling the controlled current source with the derived current calculator, the power factor correcting waveform shaper receiving as input information about an AC line input having an AC line cycle to the power factor correcting power supply and providing a signal to control output current averaged over the AC line cycle. The current sensor and the voltage sensor may measure the current and the voltage, respectively, at a point separated from the first output terminal by a resistance; and the derived current calculator may further derive a voltage correction that modifies a voltage measurement that is provided to the voltage comparison current controller. The voltage correction may be determined according to Voltage_Correction=$I_S$×R where $I_S$ is the current at the current at the output terminal exclusive of the current flowing in the bypass capacitor and R is the resistance.

In another aspect, a method for operating a power factor correcting power supply includes providing, by a controlled current source a voltage and current at a first output terminal; determining the current at the first output terminal; based on the measured current at the first output terminal, increasing or decreasing the current at the first output terminal without increasing or decreasing the voltage at includes a current sensor measuring current at the first output terminal. The determining the current at the first output terminal may include deriving the current at the first output terminal exclusive of the current flowing in a bypass capacitor. The deriving the current at the first output terminal exclusive of the current flowing in a bypass capacitor may include calculating the current according to $$I_L = I_S - C\frac{dV}{dT},$$

where $I_S$ is the current at the current at the output terminal exclusive of the current flowing in the bypass capacitor; $I_L$ is the current measured by a current sensor; C is the capacitance of the bypass capacitor, and $$\frac{dV}{dT}$$

is the rate of change of the voltage at the first output terminal with respect to time. The method ay include measuring the current and the voltage at a point separated from the first output terminal by a resistance and deriving a voltage correction that modifies a voltage measurement that is provided to the voltage comparison current controller. The method may include deriving the voltage correction according to Voltage_Correction=$I_S$×R where $I_S$ is the current at the current at the output terminal exclusive of the current flowing in the bypass capacitor and R is the resistance.

Other features, objects, and advantages will become apparent from the following detailed description, when read in connection with the following drawing, in which:

DETAILED DESCRIPTION

Figure 1:
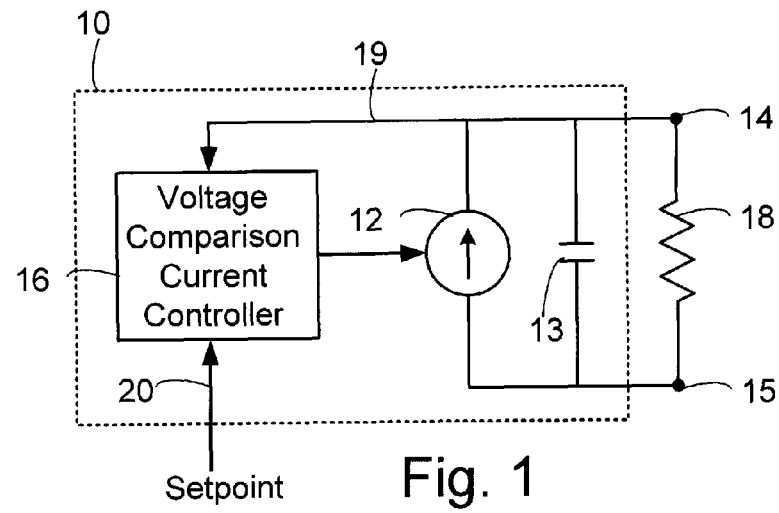
FIGS. 1-5 are block diagrams of regulated power supplies.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital-to-analog or analog-to-digital converters may not be shown in the figures.

FIG. 1 shows a simplified diagram of a regulated power supply 10. A controlled current source 12 is coupled in parallel with an output filter capacitor 13 to output terminals 14 and 15 across which a load 18 may be placed. Node 14 is operatively coupled to voltage comparison current controller 16 through voltage feedback connection 19. The voltage comparison current controller is configured to accept as input a setpoint, represented by arrow 20, and is operatively coupled to controlled current source 12.

In operation, the controlled current source 12 provides electrical power to terminals 14 and 16 to in turn provide the electrical power to the load 18. The voltage at terminal 14 is provided to voltage comparison current controller 16 through voltage feedback line 19. The voltage comparison current controller 16 provides control signals to controlled current source 12 to desirably maintain the voltage at terminal 14 at a constant voltage indicated by the setpoint. The output filter capacitor stores or releases electrical current to maintain a constant voltage at terminal 14 in the event of a sudden change demanded by load 18 if the sudden demand causes a change in voltage faster than the feedback circuit (comprising voltage feedback line 19 and voltage comparison current control 16 can adjust the voltage. A power supply according to FIG. 1 provides a fast output voltage control loop and can maintain output voltage stability in the presence of load transients in a number of situations.

Some types of power supply cannot take advantage of a fast output voltage control loop. Off-AC-line power factor correcting (PFC) supplies fall into this category. These supplies depend on allowing the voltage on a large output capacitor to vary (ripple), in order to provide the energy storage required to supply steady power while controlling the instantaneous input power to follow the AC input voltage waveform correctly for high power factor. While such supplies can provide accurate output voltage control on average, fast control of the output voltage is in direct conflict with correct control of the input current waveform. The voltage control loop must be made slow for good input waveform fidelity. This results in poor load transient response.

For applications requiring very accurate voltage control, such as computer circuitry, the poor load transient response of the PFC power supply is of little consequence. The ripple voltage required for the PFC energy storage function is already unacceptably large for such applications, so a second stage of regulation (essentially, another regulated power supply fed by the PFC supply) is required, mitigating both the ripple voltage and the transient response problem.

However, some applications, such as audio amplifiers, may not have as critical a power supply requirement as computer circuitry. For applications such as these, a simple AC line transformer followed by a peak rectifier and output filter capacitor may be sufficient, and is less expensive and complex than adding a second stage of regulation. Replacing the unregulated transformer-rectifier supply with a PFC supply is appealing because the average output voltage of the PFC is stabilized against AC line voltage variations. This also makes worldwide application straightforward. The improved AC line current waveform allows a higher power amplifier to operate with a given AC circuit current limit, and helps meet regulatory requirements relating to line harmonics. And, for a given power supply output filter capacitance, the ripple voltage is no worse (possibly slightly better) than the ripple of the transformer-rectifier supply being replaced.

The load step transient response of a conventional PFC supply is, on the other hand, substantially worse. One thing the conventional line-transformer-rectifier power supply can do well is increase its current output in response to a load transient, on the very next half cycle of the AC line. The PFC supply, with its slow voltage control loop required for good line harmonics, may take several full AC line cycles before its output current rises to meet an increased load current demand. In the meantime the extra load current must be delivered by the supply's output capacitor, causing its voltage to drop significantly. In some applications, for example audio amplifiers, the frequent presence of load transients makes this form of regulation less attractive.

Figure 2:
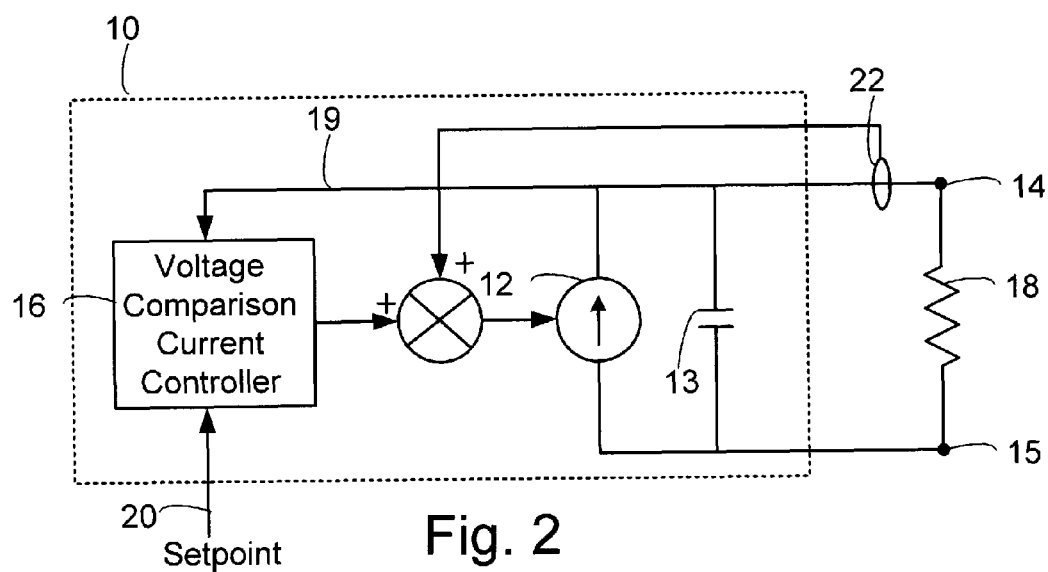

FIG. 2 show a regulated power supply that does not have the added complexity and cost of an extra regulation stage, but acts rapidly to adjust the power supply output current to match the demands of the load. The power supply of FIG. 2 provides a control to increase or decrease the current output of the power supply (typically a PFC supply) directly and immediately in response to an increase or decrease in load current, without waiting for the voltage on the energy storage capacitor to signal that change. There are a number of desirable features in implementations of this control. The added control must be stable, and not upset the stability of the other control loops required by the power supply. In the case of the PFC supply, the added control mechanism must also achieve sinusoidal line current consumption.

The power supply of FIG. 2 includes the elements of the power supply of FIG. 1, and in addition includes a current sensor to sense the current to the output terminal 14. The current sensor 22 is operatively coupled to a summer 24, which is operatively coupled to controlled current source 12. The voltage comparison current controller is operatively coupled to the summer.

In operation, the current load measurement is fed into the control loop of FIG. 1. If the load 18 requires, for example, 1 A of additional current, a signal is injected into the power supply current control loop forcing it immediately to deliver 1 A of additional current. The "load" into which the power supply's controlled current source is delivering its current is not just the load which is demanding the extra ampere, but the parallel combination of that load and the power supply output filter capacitor. If the extra ampere of load current is detected instantaneously, and the power supply commanded to produce the additional ampere instantaneously, no current will flow into or out of the filter capacitor, so the voltage across is will not change, which is the desired outcome. To the extent that the current change is not detected or responded to instantaneously, the capacitor will momentarily take up the slack, and the voltage feedback loop of FIG. 1 will, in time, adjust the power supply's output current to bring the voltage back to the correct value. If the correction is not perfectly accurate, for example, if 1 A is detected but 1.1 A is commanded, the filter capacitor voltage will start to rise, and the voltage control loop will eventually compensate by reducing the current command by 0.1 A. In either event the response required from the voltage loop will be much smaller than if no load current compensation had been applied.

Figure 3:
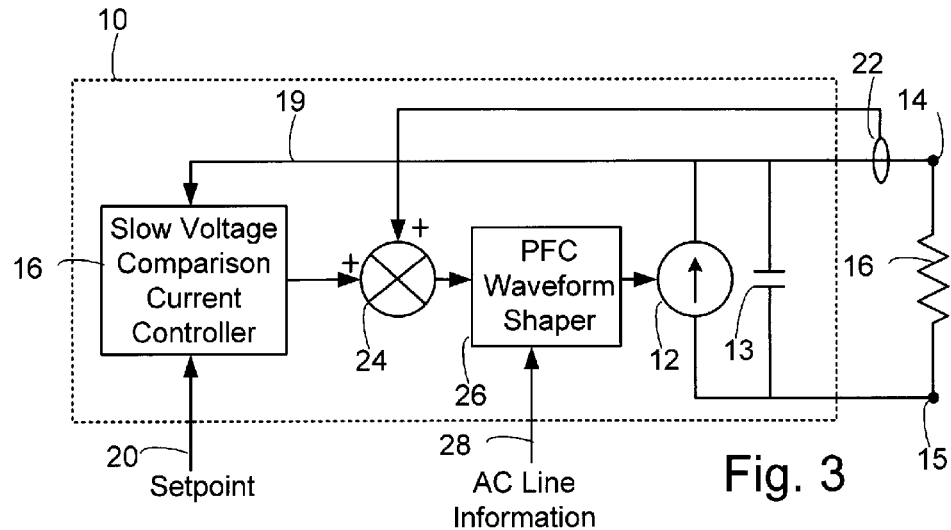

Directly increasing the supply current in response to an increase in load current, especially one-for-one may appear to risk "run away" as the power supply increases its current, increasing the load current, causing the power supply to increase its current even more, and so on. In general, this will not happen. The load current depends on what task the load is performing, and it may also depend on the voltage of the power supply, but it does not depend directly on the current from the power supply. Provided there is filter capacitance present, the load current is not constrained to equal the supply current. The difference between the supply current and the load current flows into the filter capacitance, causing the voltage to change slightly. The power supply voltage control loop then makes adjustments to the supply current in an attempt to maintain the output voltage at the correct value, ensuring on average, but not instantaneously, that the supply current equals the load current. The effect of the additionally implemented control is to get the supply current approximately where it needs to be immediately, relying on the voltage loop only to correct any errors. While the load current does not directly depend on the supply current, it may depend on the supply voltage. From that standpoint, the loads many applications, such as audio amplifiers, present are benign. Class A and B amplifiers don't change their current demand in response to supply voltage changes within their normal operating range at all, as long as they aren't forced into clipping. Class D amplifiers actually reduce their current as voltage increases. This is the opposite of the response required for the "runaway" condition to occur, but for the small percentage changes involved here, the effect is in any case minimal FIG. 3 shows a power factor correcting (PFC) power supply with the current sensor of FIG. 2. The power supply of FIG. 3 includes a PFC waveform shaping circuit 26 that includes a fast inner current loop. The waveform shaping circuit 26 couples the summer 24 and the controlled current source 12. The PFC waveform shaping circuit 26 receives as input information about the AC line power source that provides power to the power supply 10, as represented by arrow 28.

In operation, the waveform shaping circuit 26 receives as input the AC line information (typically including the AC input voltage and an estimate of the rms input voltage) and a signal derived from the output voltage error from voltage comparison current control 20 to control the output current averaged over the AC line cycle. The output capacitor 13 does the averaging, allowing the voltage loop to be closed without disrupting the desired sinusoidal input current, as long as the targeted loop bandwidth is much slower than the AC line period. The signal derived from the output voltage error from the voltage comparison current control is effectively an output current control, albeit one which allows its effect to be further shaped by the AC input voltage to control the input current waveform. The injection of the signal from the current sensor 22 changes the input waveform in a specific and relatively benign fashion. It changes the input current waveform from the trajectory it was following to product the "old" output current onto the trajectory it needs to follow to produce the "new" output current. While the result is no longer sinusoidal, it is at least a sinusoid modulated by the load current. No matter how fast the response to load current is made, the input current will still be sinusoidal if the load current does not change, so the degree to which the input current becomes non-sinusoidal with varying load current can be controlled by adjusting the bandwidth of the load current sensing, without concern for the input current waveform in the steady state. And with reasonable load current sensing bandwidth, the PFC output current can be increased to meet the load demand on the very next AC line half cycle, just as fast as achieved by the transformer-rectifier supply.

Figure 4:
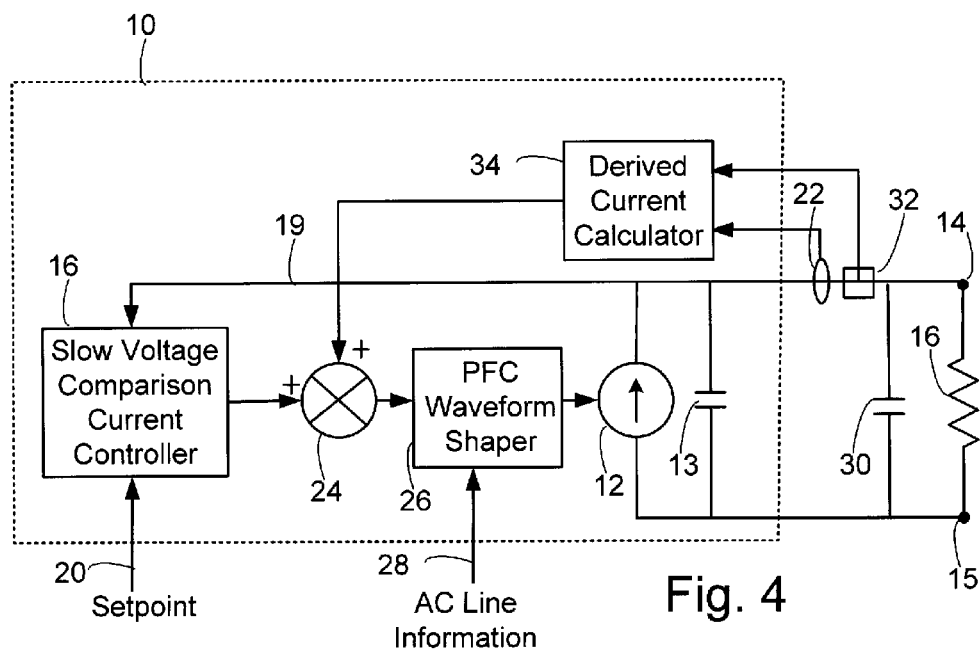

The power supply of FIG. 4 includes the elements of the power supply of FIG. 3, and in addition includes a bypass capacitor 30 in parallel with the load 18. The power supply of FIG. 4 further includes a voltage sensor 32 that detects the voltage at the output of the power supply. The voltage sensor is operatively coupled to a derived current calculator 34, which is operatively coupled to summer 24. The current sensor 22 is operatively coupled to the derived current calculator 34.

The derived current calculator 34 is useful in situations in which a bypass capacitor 30 is positioned very near the load 18. The load current signal should not include any current flowing in bypass capacitors such as bypass capacitor 30, but bypass capacitors are often located right next to a load, and often constitute a significant part of the total filter capacitance for the power distribution system. The bypass capacitors may require very low impedance connections to the load 18 to operate properly, precluding the insertion of a current-detecting device. There may also be a number of load devices and associated bypass capacitors (such as for multiple channels in an amplifier), making it inconvenient to sense the total load current right at the load. If the most convenient current sensing point is such that it responds to the desired load current plus the current in a substantial amount of filter capacitance, the sensed current will be $$I_S = I_L + C \times dV/dT$$

where $I_S$ is the sensed current, $I_L$ is the actual load current, C is the total capacitance between the current sensing point and the load, and V is the supply/load voltage. The load current, then, can be determined by the derived current calculator by $$I_L = I_S - C \times dV/dT$$

a computation which is easy to perform with simple analog components. The resulting signal is applied to the power supply output current control point.

While $I_L$ does not respond directly to power supply output current, $I_S$ does, since now the additional filter capacitance and the power supply output filter capacitance form a capacitive current divider on the power supply output current. If the response to $I_S$ measurement is faster than the response to $C \times dV/dT$, instability may be a risk. In most cases, however, $C \times dV/dT$ will tend to respond faster, and if it does not, the $I_S$ measurement may be slowed slightly.

If the capacitance beyond the current measurement point is a substantial amount of the total, as is often the case, then a substantial amount (perhaps most) of the PFC ripple current is flowing in that capacitance. While $I_L$ does not contain significant ripple current, $I_S$ does, and a ripple-free determination of $I_L$ depends on cancellation between $I_S$ and $C \times dV/dT$. Accurate cancellation depends on accurate measurements of $I_S$ and V, and on accurate knowledge of C. Failure to achieve good cancellation will result in a substantial ripple current component in the control signal added in at the output of the voltage comparison current control 16, which will degrade the input current waveform. In practice, reasonable cancellation can be achieved, but if the cancellation is not good enough for acceptable input current distortion, there are several alternatives. Filtering may be performed on the control signal. Some filtering is necessary, since dV/dt can't be carried out to very high frequencies. Heavier filtering degrades the load transient response somewhat, but unlike filtering in the voltage control loop, it does not introduce instability since controlling power supply output current based on load current is a feedforward, not a feedback, system. So, practical control of the power supply current in response to the load current, even when it can't be measured directly at the load, can be achieved.

Figure 5:
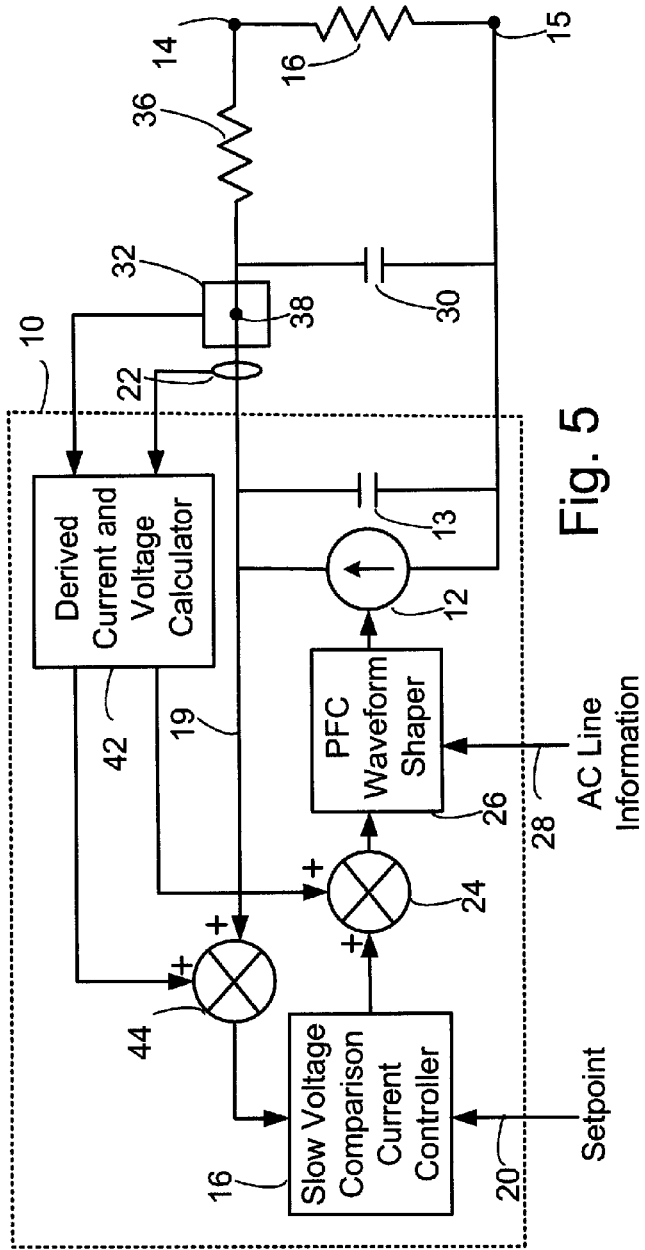

FIG. 5 shows a power supply having an impedance 36 at the output of the power supply between the point 38, at which current and voltage can conveniently be sensed, and the load 18. The power supply of FIG. 5 has the elements of the power supply of FIG. 4, but the derived current calculator 34 of FIG. 4 is replaced by a derived current and voltage calculator 42. The current sensor 22 and the voltage sensor 40 are operatively coupled to the derived current and voltage calculator 42, which is in turn operatively coupled to summer 24 and to voltage summer 44. Voltage summer 44 couples voltage feedback line 19 and voltage comparison current control 16. To avoid confusion, current sensor 22 is shown as slightly removed from point 38, at which the voltage sensor is positioned. Preferably the current sensor 22 is positioned as close to point 38 as possible, and preferably at a point that is substantially electrically equivalent to point 38.

With configuration of FIG. 5, relationship $I_L = I_S - C \times dV/dT$ of FIG. 4 must be modified since the voltage being sensed is no longer equal to the voltage at the load and its filter capacitors, but is increased by the voltage dropped across the intervening impedance. If that impedance is resistive (not a requirement, but easiest to describe, and valid for many practical applications) and has value R, the sensed voltage will be increased by $I_S \times R$, resulting in the relationship $$I_L = I_S - C \times d(V - R \times I_S)/dT \text{ or}$$

$$I_L = I_S + RC \times dIs/dt - C \times dV/dT$$

Adjusting the current command in the power supply by $I_L$ will improve load transient response, as in the previous implementations, but a steady state correction is also required. If the load current changes, that current change will change the DC voltage across the intervening impedance. If the PFC voltage control loop acts only to maintain the PFC output voltage at the same value as before the change, the voltage at the load will change, even in the steady state. To keep the load voltage constant in the long term, a correction of $I_S \times R$ should be injected into the PFC voltage control loop. With both the transient and the steady state corrections applied, the PFC output voltage will move quickly in response to a load current change to the new PFC voltage necessary to maintain the correct voltage at the load. Since the voltage across the PFC output filter capacitor must now change in response to a load transient, best performance will be achieved if that capacitance is kept relatively small compared to the filter capacitors directly at the load.

If the measurements and computations are accurate, no stability issues arise. Regardless of the presence of the intervening impedance, the element being sensed, the load current, is still not directly dependent on the PFC output current being controlled. The correction to the PFC output voltage also will have no effect on the load current, because if it is done accurately, the voltage supplied to the load will not change. But there are potential stability concerns if the load current estimate is not accurate. In particular, the computation contains the term $C \times dV/dT$, but V now does respond directly to Iin, on account of the intervening impedance. The computation also contains the term $RC \times dIs/dt$, which most certainly responds to Iin. If all the scale factors are correct, these terms will cancel, but since they will not exactly cancel in practice, and the derivative increases with frequency, instability may occur, and some precautions are advisable. One precaution is to limit the frequency range of application. There is little value trying to make corrections much faster than half an AC line cycle, since the PFC cannot be counted on to respond any faster anyway. A second precaution is based on the polarities of the two derivative terms. $C \times dV/dT$ goes into the correction with a minus sign, so increasing Iin, which increases V, tends to force Is downward, in the direction of stability. $RC \times dIs/dt$ on the other hand, goes in positively, tending to instability. Judicious biasing of scale factors in favor of the $C \times dV/dT$ term will result in assured stability over component variations at the expense of a little degradation of transient response.

The same considerations apply to input current waveshape. Since $I_L$ does not contain twice line frequency components resulting from power supply operation, neither does an accurate estimation of $I_L$. But inaccuracies which prevent good cancellation between $C \times dV/dT$ and $RC \times dIs/dt$, both of which contain twice line frequency components, may introduce line current distortion. Similar mitigation strategies to the power supplies of FIGS. 2-4 are applicable. Also, the output filter capacitance already present in the PFC helps to reduce both instability and input current waveshape distortion, again at the expense of some degradation of transient response. Load current estimation and correction completely corrects the steady state error, and even if the transient error correction requires tempering to manage stability and input current waveshape distortion, the transient performance is still substantially improved over that which the PFC can deliver without the correction.

A practical application benefitting from the configuration of FIG. 5 is found in audio amplifiers. Amplifiers intended to drive normal loudspeakers generally require a supply voltage in the tens of volts to the low hundred volt range. PFC power supplies, especially those intended for world-wide line voltages, usually have an output voltage set to 380 volts or higher, since it is most economical to design a PFC supply whose output voltage is as high as the peak voltage of the highest AC line at which it must operate. Furthermore, galvanic isolation from the AC line is almost always required in audio amplifiers (as in most systems), and the common PFC power supply structure does not provide such isolation. For many applications, such as computer systems, a second stage regulator takes on the functions of producing the desired output voltage and providing line isolation, but for an audio amplifier additional regulation is unnecessary. A non-regulating isolating synchronous converter (a "DC transformer") is simpler and better able to handle the load characteristics. This device is often referred to as an "isolation converter".

Figure 6:
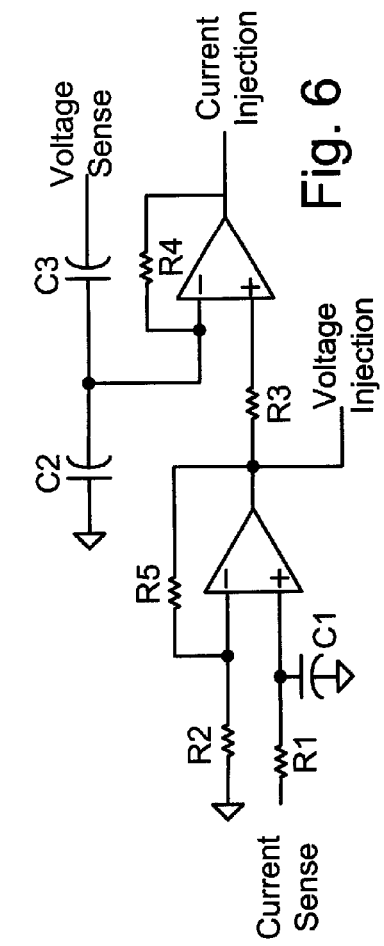
FIG. 6 is schematic diagram of an analog circuit.

A PFC may be folded together with an isolation converter to make an "isolating flexible-voltage PFC", and load current detection and supply output current control applied to the combination, as in FIG. 4. Such an approach requires that the current and voltage signals be passed from the safety-isolated side, where the load current, the current sensing and the output voltage actually occur, to the non-isolated side where the control is implemented. But the expense of transmitting the signals over an isolation barrier can be avoided using load current estimation in the presence of intervening impedance. An ideal isolation converter imposes input/output relationships $I_{in}=(n/m) \times I_{out}$ and $V_{in}=(m/n) \times V_{out}$, where m/n is the voltage transformation ratio, or "turns ratio" of the isolation converter. The load at the output of an ideal isolation converter is perfectly reflected at its input with an impedance transformation $Z_{in}=(n/m)^2 \times Z_{out}$. So, if current and voltage are sensed at the input of an ideal isolation converter which is supplying the load along with its bypass capacitors, the configuration of FIG. 4 may still be applied, provided the value of the capacitance used in the analog signal processing block is decreased by $(n/m)^2$. But practical isolation converters have losses. The idle losses cause current to be drawn even when the load is not drawing current. Although sensing this current represents an error in the determination of the load current, commanding the additional current from the PFC is nevertheless exactly the correct response, so if this were the only non-ideality in the converter, the configuration of FIG. 4 will still provide the correct behavior. Practical isolation converters also have losses which increase with increasing load. These losses can be modeled well with equivalent series resistance, in which case the configuration of FIG. 5 is applicable. An example analog circuit capable of performing the necessary signal processing is shown in FIG. 6.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. A power factor correcting power supply, comprising:
   first and second output terminals for accommodating terminals of an electrical load;
   a controlled current source for providing electrical power of a regulated current and a regulated voltage to the first output terminal;
   a voltage comparison current controller; and
   a control circuit responsive to the current at the first output terminal, the control circuit coacting with the voltage comparison current controller to cause the controlled current source to increase or decrease the current at the first output terminal, the control circuit comprising:
      a bypass capacitor coupling the first output terminal and the second output terminal;
      a current sensor measuring the combined current flowing through the bypass capacitor and to the first output terminal;
      a voltage sensor sensing voltage at the first output terminal or at a point separated from the first output terminal by a resistance; and
      a derived current calculator operationally coupled to the current sensor and to the voltage sensor, to determine the current at the output terminal exclusive of current flowing in the bypass capacitor.

2. The power factor correcting power supply of claim 1, wherein the derived current calculator determines the current at the output terminal exclusive of current flowing in the bypass capacitor according to $$I_L = I_S - C \frac{dV}{dT},$$

where $I_L$ is the current at the current at the output terminal exclusive of the current flowing in the bypass capacitor; $I_S$ is the current measured by the current sensor; C is the capacitance of the bypass capacitor, and $$\frac{dV}{dT}$$

is the rate of change of the voltage sensed by the voltage sensor with respect to time.

3. The power factor correcting power supply of claim 1, further comprising:
   a power factor correcting waveform shaper coupling the controlled current source with the derived current calculator, the power factor correcting waveform shaper receiving as input information about an AC line input having an AC line cycle to the power factor correcting power supply and providing a signal to control output current averaged over the AC line cycle.

4. The power factor correcting power supply of claim 3,
   wherein the current sensor and the voltage sensor measure the current and the voltage, respectively, at a point separated from the first output terminal by a resistance; and
   wherein the derived current calculator further derives a voltage correction that modifies a voltage measurement that is provided to the voltage comparison current controller.

5. The power factor correcting power supply of claim 4, wherein the voltage correction is determined according to $$\text{Voltage\_Correction} = I_S \times R$$

where $I_S$ is sensed current at the current and R is the resistance.

6. A method for operating a power factor correcting power supply, comprising:
   providing, by a controlled current source a voltage and current at a first output terminal;
   sensing a combined current flowing through a bypass capacitor and to the first output terminal;
   sensing a voltage;
   determining the current at the first output terminal;
   based on the determined current at the first output terminal, increasing or decreasing the current at the first output terminal
   wherein the determining the current at the first output terminal comprises deriving the current at the first output terminal exclusive of the current flowing in the bypass capacitor based on the sensed current and the sensed voltage.

7. The method of claim 6, wherein the deriving the current at the first output terminal exclusive of the current flowing in a bypass capacitor comprises calculating the current according to $$I_L = I_S - C\frac{dV}{dT},$$

where $I_L$ is the current at the output terminal exclusive of the current flowing in the bypass capacitor; $I_S$ is the sensed current; C is the capacitance of the bypass capacitor, and $$\frac{dV}{dT}$$

is the rate of change of the sensed voltage with respect to time, wherein the sensed voltage is sensed at the first output terminal.

8. The method of claim 6, wherein sensing the current and sensing the voltage comprises:

sensing the current and the voltage at a point separated from the first output terminal by a resistance; and wherein the method of operating the power factor correcting power supply further comprises deriving a voltage correction that modifies a voltage measurement that is provided to a voltage comparison current controller.

9. The method of claim 8, comprising deriving the voltage correction according to $$\text{Voltage\_Correction} = I_S \times R$$

where $I_S$ is the sensed current and R is the resistance.

10. The method of claim 6, further comprising providing the sensed current and the sensed voltage to a derived current calculator, wherein the derived current calculator is configured to derive the current at the first output terminal exclusive of the current flowing in the bypass capacitor based on the sensed current and the sensed voltage.

* * * * *